(12) United States Patent
Hirose

(10) Patent No.: US 10,394,508 B2
(45) Date of Patent: Aug. 27, 2019

(54) INFORMATION PROCESSING APPARATUS AND INFORMATION PROCESSING METHOD

(71) Applicant: Mitsuhiko Hirose, Tokyo (JP)

(72) Inventor: Mitsuhiko Hirose, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/682,614

(22) Filed: Aug. 22, 2017

(65) Prior Publication Data

US 2018/0074769 A1 Mar. 15, 2018

(30) Foreign Application Priority Data

Sep. 9, 2016 (JP) ................................ 2016-177089

(51) Int. Cl.
*G06F 3/12* (2006.01)
*H04N 1/00* (2006.01)
*G06Q 10/10* (2012.01)

(52) U.S. Cl.
CPC ....... *G06F 3/1296* (2013.01); *H04N 1/00222* (2013.01); *G06Q 10/103* (2013.01); *G06Q 10/107* (2013.01); *H04N 1/00209* (2013.01); *H04N 2201/0008* (2013.01); *H04N 2201/0094* (2013.01)

(58) Field of Classification Search
CPC combination set(s) only.
See application file for complete search history.

(56) References Cited

U.S. PATENT DOCUMENTS

| 5,745,607 A | 4/1998 | Maeda |
| 2007/0159652 A1 | 7/2007 | Sato |
| 2012/0050823 A1* | 3/2012 | Khawaja ............ H04N 1/00212 358/474 |
| 2013/0013662 A1 | 1/2013 | Masuda |
| 2016/0004488 A1 | 1/2016 | Hirose |

FOREIGN PATENT DOCUMENTS

| JP | 2005-159705 A | 6/2005 |
| JP | 2013-020326 | 1/2013 |

OTHER PUBLICATIONS

Extended European Search Report dated Nov. 22, 2017.

* cited by examiner

*Primary Examiner* — Helen Zong
(74) *Attorney, Agent, or Firm* — Harness, Dickey & Pierce, P.L.C.

(57) ABSTRACT

An information processing apparatus includes circuitry to execute workflow processing on data according to a workflow. The workflow defines a plurality of processes in a predetermined order. The circuitry obtains a first size of the data after a specific process of the plurality of processes is performed. The circuitry performs a subsequent process based on the first size. The subsequent process is one of a plurality of subsequent processes each of which is defined as a process subsequent to the specific process in the workflow.

14 Claims, 13 Drawing Sheets

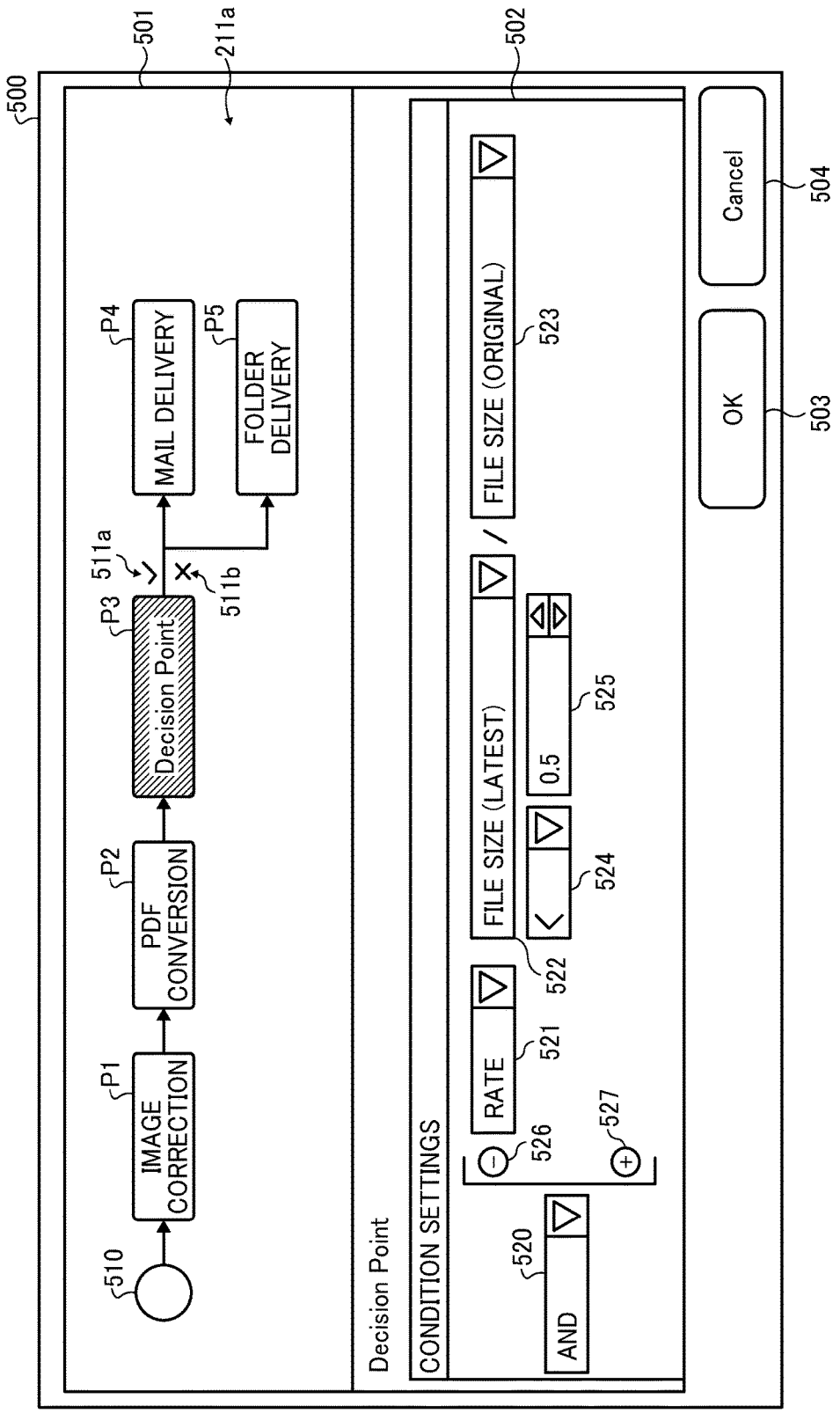

FIG. 6

```
 1: <?xml version='1.0' encoding='UTF-8'?>
 2: <flows>
 3:   <flow>
 4:     <startpoint>
 5:       <nextPlugin id="@ImageProcessingToolbox" index="0" />
 6:     </startpoint>
 7:     <plugin id="@ImageProcessingToolbox" index="0" type="filter" displayName="IMAGE CORRECTION" >
 8:       <nextPlugin id="@RPDFConverter" index="0" />
 9:     </plugin>
10:     <plugin id="@RPDFConverter" index="0" type="filter" displayName="PDF CONVERSION" >
11:       <nextPlugin id="@DecisionPoint" index="0" />
12:     </plugin>
13:     <plugin id="@DecisionPoint" index="0" type="filter" displayName="Decision Point" >
14:       <nextPlugin id="@ToSMTP" index="0" decision="true" />
15:       <nextPlugin id="@ToFolder" index="0" decision="false" />
16:     </plugin>
17:     <plugin id="@ToSMTP" index="0" type="output" displayName="MAIL DELIVERY" />
18:     <plugin id="@ToFolder" index="0" type="output" displayName="FOLDER DELIVERY" />
19:   </flow>
20: </flows>
```

FIG. 8

```
 1: <?xml version='1.0' encoding='UTF-8'?>
 2: <document>
 3:   <content>
 4:    <section number="1">
 5:     <rendition type="Primary" path="scan_001.tif" inside"true">
 6:      <name>20140702112802</name>
 7:     </rendition>
 8:    </section>
 9:   </content>
10:   <properties>
11:    <basic>
12:     <property id="scanPageCount">
13:      <value>1</value>
14:     </property>
15:     <property id="hostAddress">
16:      <value>133.139.237.216</value>
17:     </property>
             ⋮
18:     <property id="generationDatelocal">
19:      <value>20140702T112802</value>
20:     </property>
21:     <property id="contentSize">     ⎫
22:      <value>425736</value>           ⎬ 600
23:     </property>                      ⎭
             ⋮
24:    </basic>
25:   </properties>
26: </document>
```

FIG. 11

```
 1:<?xml version='1.0' encoding='UTF-8' ?>
 2:<document>
 3:  <content>
 4:    <section number="1">
 5:      <rendition type="Primary" path="scan_001.tif" inside="true">
 6:        <name>20140702112802</name>
 7:      </rendition>
 8:    </section>
 9:  </content>
10:  <properties>
11:    <basic>
12:      <property id="scanPageCount">
13:        <value>1</value>
14:      </property>
15:      <property id="hostAddress">
16:        <value>133.139.237.216</value>
17:      </property>
              ⋮
18:      <property id="generationDateLocal">
19:        <value>20140702T112802</value>
20:      </property>
21:      <property id="contentSize">        ⎫
22:        <value>425736</value>             ⎬ 600
23:      </property>                        ⎭
24:      <property id="latestContentSize"> ⎫
25:        <value>190773</value>            ⎬ 601
26:      </property>                        ⎭
              ⋮
27:    </basic>
28:  </properties>
29:</document>
```

INFORMATION PROCESSING APPARATUS AND INFORMATION PROCESSING METHOD

CROSS-REFERENCE TO RELATED APPLICATION

This patent application is based on and claims priority pursuant to 35 U.S.C. § 119(a) to Japanese Patent Application No. 2016-177089, filed on Sep. 9, 2016, in the Japan Patent Office, the entire disclosure of which is hereby incorporated by reference herein.

BACKGROUND

Technical Field

The present embodiments relate to an information processing apparatus and an information processing method.

Related Art

An image forming apparatus that processes data according to a workflow in which a plurality of processes are defined in a predetermined order is known. Additionally, a technique in which information based on the data to be processed is used for controlling workflow processing is known.

In the workflow processing, the data to be processed by each process in the workflow may vary according to the processes that have been performed on such data, such as image processing, conversion, and the like. In the known technique, a change in the change of data to be processed is not considered, and it is difficult to adjust the workflow dynamically according to the change of the data to be processed by each process.

SUMMARY

An improved information processing apparatus includes circuitry to execute workflow processing on data according to a workflow. The workflow defines a plurality of processes in a predetermined order. The circuitry obtains a first size of the data after a specific process of the plurality of processes is performed. The circuitry performs a subsequent process based on the first size. The subsequent process is one of a plurality of subsequent processes each of which is defined as a process subsequent to the specific process in the workflow.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is an illustration of an example of a workflow setting screen according to the first embodiment;

FIG. 6 is an illustration of an example of workflow definition information according to the first embodiment;

FIG. 8 is an illustration of an example of bibliographic information according to the first embodiment;

FIG. 11 is an illustration of an example of bibliographic information to which a property indicating the latest file size is added;

DETAILED DESCRIPTION

Figure 1:
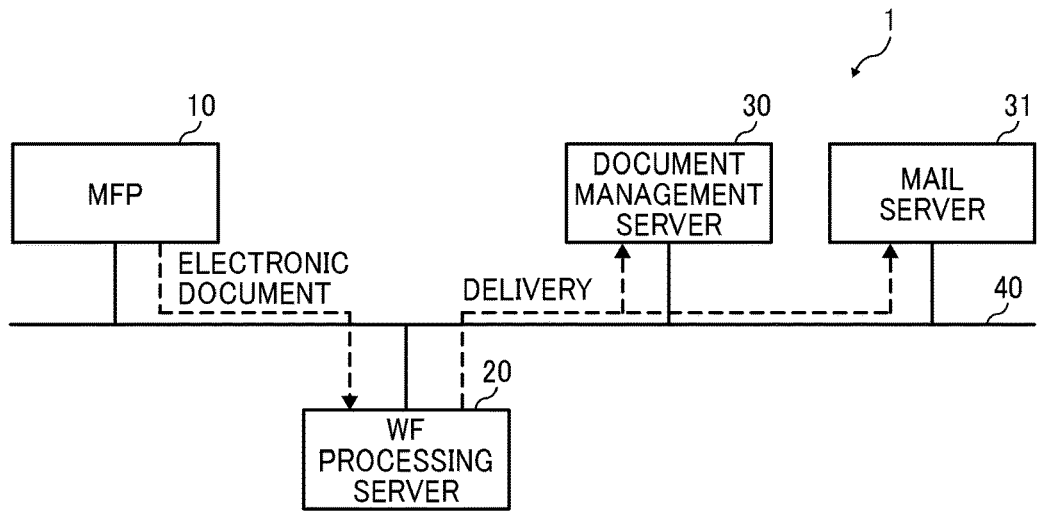
FIG. 1 is a block diagram illustrating an information processing system according to a first embodiment of the present disclosure.

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

The embodiments of the present disclosure relate to an information processing apparatus, a method of processing information, and a non-transitory recording medium are described below with reference to drawings.

First Embodiment

FIG. 1 is a block diagram illustrating an information processing system 1 according to a first embodiment. In FIG. 1, the information processing system 1 includes a multi-function printer (MFP) 10, a workflow (WF) processing server 20, a document management server 30, and a mail server 31. The MFP 10, the WF processing server 20, the document management server 30, and the mail server 31 are communicably connected to each other through a network 40.

The MFP 10 implements multiple functions in association with image forming, such as printing, scanning, faxing, and copying. The WF processing server 20 manages a plurality of workflows in each of which a plurality of processes are defined, while controlling processing according to each workflow. A workflow defines a combination of the processes for performing a service. Each process in the workflow is implemented with, for example, a plugin program (hereinafter, referred to as a plugin). The WF processing server 20 also manages the plugins, each of which corresponds to one of the processes.

The document management server 30 receives document data transferred through the network 40, and stores the received document data in, for example, a folder to be managed. For example, the folder, in which an electronic document is stored by the document management server 30, is accessible from other information devices (e.g., personal computers, etc.) through the network 40 so that the electronic document can be delivered. Such a delivery of the electronic document using the folder is referred to as a folder delivery.

The mail server 31 sends and receives electronic mail (Email) within the network 40 or to and from the outside of the network 40. The electronic document can be delivered by attaching the electronic document to an email sent to a designated destination. Such a delivery of the electronic document using the email is referred to as a mail delivery.

Here, the electronic document is a file storing image data of a document read with a scanner, for example. However, the electronic document is not limited to this and may alternatively be a file storing document data generated using a document creation application program with a personal computer, for example.

Operation of delivering the electronic document, which is a document created by a user, with the file delivery or the mail delivery in the information processing system 1 having the above-described configuration is briefly described.

First, a control panel of the MFP 10 displays available workflows managed by the WF processing server 20. A workflow to be used can be selected from the workflows displayed on the control panel according to operation to the control panel by the user. The user operates the control panel to select, for example, a workflow for delivering the electronic document with the folder delivery or the mail delivery. Information indicating the selected workflow is sent from the MFP 10 to the WF processing server 20 through the network 40.

Subsequently, the MFP 10 starts reading a document set on a platen by the user when the user operates the control panel to do so. A file storing image data obtained by reading the document is sent to the WF processing server 20 through the network 40 as an electronic document based on the read document. The WF processing server 20 receives the electronic document.

The WF processing server 20 performs processes defined in the workflow, namely executes processing according to the workflow, which is designated at the MFP 10. The processing (hereinafter, the processing may be referred to as workflow processing), is performed on the electronic document according to the workflow. In this example, the WF processing server 20 converts a format of the electronic document into a format appropriate for the delivery, and transfers the electronic document to the document management server 30 or the mail server 31 to deliver the electronic document with the folder delivery or the mail delivery. Alternatively, the WF processing server 20 may obtain the electronic document stored in a predetermined folder and perform the processes defined in the workflow designated by the user on the electronic document.

In the information processing system 1 according to the first embodiment, the workflow processing server 20 controls the workflow processing on the electronic document according to a state of the electronic document being processed according to the workflow. More specifically, the WF processing server 20 dynamically controls the workflow processing according to variation in a file size of the electronic document being processed according to the workflow.

Delivery of the electronic document with the information processing system 1 according to the first embodiment is briefly described. As described above, the workflows managed with the WF processing server 20 are displayed on the control panel so that one of the workflows can be selected according to a user operation. The workflows displayed with the MFP 10, here, relates to, for example, a workflow in which the electronic document is processed according to a file size of the electronic document or a compression ratio of the file that is compression-coded.

The MFP 10 starts reading a document set on a platen by the user when the user selects the workflow to be executed by operating the control panel of the MFP 10. The MFP 10 stores image data obtained by reading the document in a file to create the electronic document based on the read document. Additionally, the MFP 10 adds a current file size of the electronic document in bibliographic information associated with the electronic document, as an original file size (second size). The bibliographic information is information that is temporarily stored in association with the electronic document and used in the workflow processing.

The MFP 10 sends the electronic document and the bibliographic information to the WF processing server 20. The WF processing server 20 executes workflow processing on the electronic document sent from the MFP 10, namely performs the processes defined in the workflow. In the workflow, the file size of the electronic document may vary when a specific type of process (specific process), such as image processing including image conversion, completion coding of the file, or the like is performed. The WF processing server 20 obtains a file size of the electronic document as the latest file size (first size) each time after the specific type of process is performed in the workflow.

The WF processing server 20 adds information indicating the obtained latest file size to the bibliographic information sent from the MFP 10 and updates the bibliographic information. When the bibliographic information, at this time, already has information indicating a previous latest file size, the WF processing server 20 replaces the information indicating the previous latest file size with the information indicating the latest file size that is obtained to update the bibliographic information.

The WF processing server 20 determines whether a process in the workflow is the specific type of process that requires obtaining a file size, based on information indicating a type of a plugin for performing the process, namely the WF processing server 20 determines whether a type of the plugin is a specific type of plugin. That is, the WF processing server 20 manages each plugin associated with corresponding information indicating the type of plugin. For example, the types of plugin that can be designated in the workflow include an image processing type, of which the plugin performs image processing, and a delivery type, of which the plugin performs delivery processing, and the plugins in the workflow can be classified into either one of the image processing type and the delivery type. The WF processing server 20 checks the type of the plugin to perform the process. The WF processing server 20 determines whether it is necessary to update the bibliographic information with the latest file size after the process of the plugin according to a result of checking the type of plugin.

The WF processing server 20 according to the first embodiment can obtain, from the bibliographic information, the original size of the electronic document before the workflow processing is executed and the latest file size after the specific type of process is performed in the workflow. Accordingly, the workflow can be flexibly controlled with a condition of the file size in consideration of the original size of the file of the electronic document. For example, the first embodiment is applicable to image processing in which the file size is compressed 50 percent or less, or the file size is increased to 150 percent.

Configuration According to First Embodiment

Figure 2:
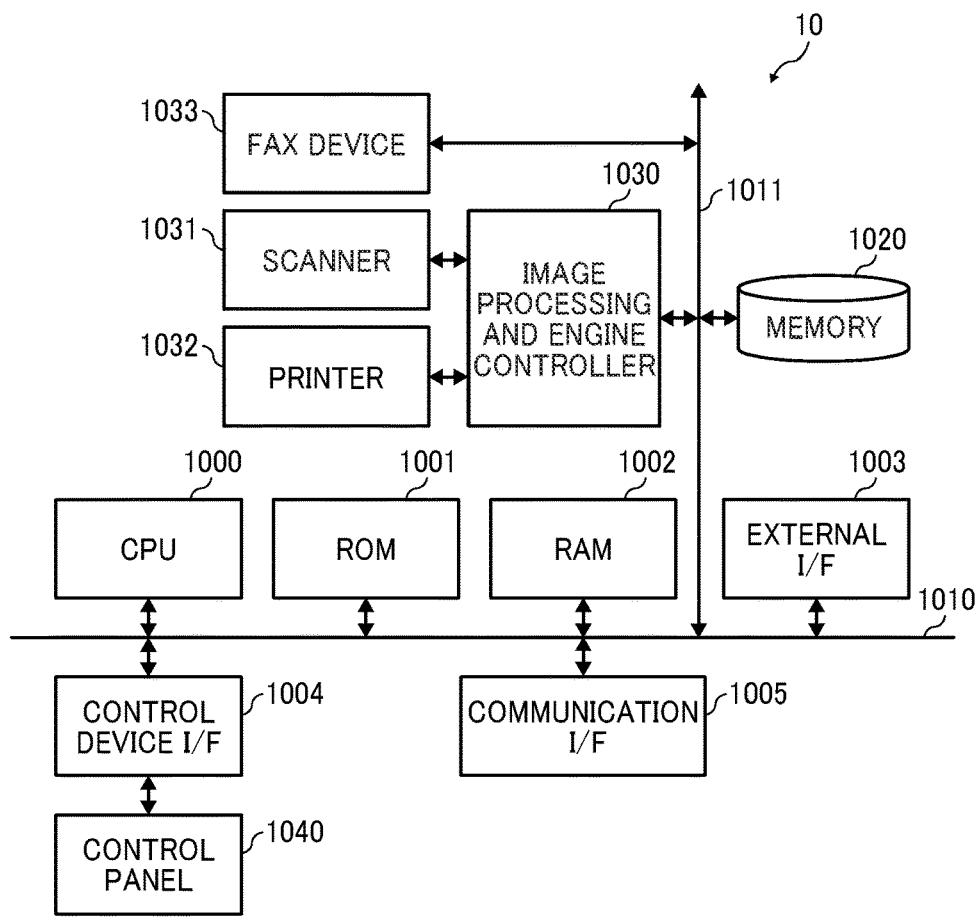
FIG. 2 is a block diagram illustrating a hardware configuration of a multi-function printer (MFP) according to the first embodiment.

FIG. 2 is a diagram illustrating an example of a hardware configuration of the MFP 10 according to the first embodiment. In FIG. 2, the MFP 10 includes a central processing unit (CPU) 1000, a read only memory (ROM) 1001, a random access memory (RAM) 1002, an external interface I/F 1003, a control device I/F 1004, a control panel 104, a communication I/F 1005, and a memory 1020. Additionally, the MFP is configured to implement each function of the MFP 10.

The memory 1020 is a non-volatile recording medium to store data, and a hard disk drive, a flash memory, or the like may be used. The memory 1020 stores a program and data used for operating the CPU 1000.

This example of the MFP 10, which has the functions of printing, copying, scanning, and faxing, includes an image processing and engine controller 1030, a scanner 1031, a printer 1032, and a (facsimile) FAX device 1033 to perform the respective functions. The above described units included in the MFP 10 are communicably connected to each other through buses 1010 and 1011.

The CPU 1000 controls overall operation of the MFP 10 according to a program stored in advance, for example, in the ROM 1001 or the memory 1020 by using the RAM 1002 as a working memory.

The control device I/F 1004 is connected to a control device that receives a user operation and a display that displays information to the user. The control panel 1040 may use a touch panel that outputs a signal according to a position being touched, and may integrally include the touch panel and the display. The signal output from the control panel 1040 according to the user operation is provided to the CPU 1000 through the control device I/F 1004. Additionally, the control device I/F 1004 causes the display of the control panel 1040 to display a screen according to a display control signal supplied from the CPU 1000.

The communication I/F 1005 controls communication in association with the network 40 according to an instruction of the CPU 1000. The external I/F 1003 is an interface, such as a universal serial bus (USB) interface, for connecting to an external device.

The scanner 1031 scans and reads an image of a document set on the platen using an optical sensor, such as a contact image sensor (CIS), and outputs image data. The printer 1032 forms an image on a medium based on the image data by using an image forming method, such as an inkjet printing method or an electrophotographic method.

The image processing and engine controller 1030 controls the scanner 1031 and the printer 1032 according to the instruction of the CPU 1000. Additionally, the image processing and engine controller 1030 performs predetermined image processing on the image data read with the scanner 1031 to be output to the bus 1011 according to the instruction of the CPU 1000. The image processing and engine controller 1030 also performs the predetermined image processing on the image data provided via the bus 1011 to be provided to the printer 1032. The FAX device 1033 is connected, for example, to a public telephone line, and performs fax transmission processing on the image data provided through the bus 1011 according to the instruction of the CPU 1000.

Figure 3:
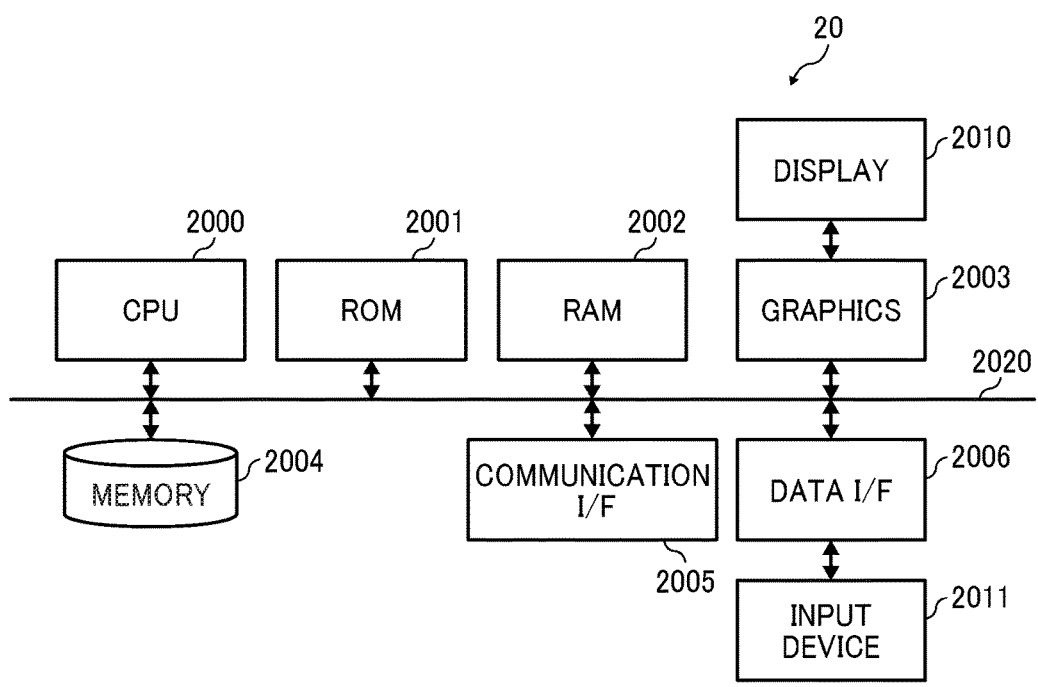
FIG. 3 is a schematic block diagram illustrating a hardware configuration of a workflow (WF) processing server according to the first embodiment.

FIG. 3 is a block diagram illustrating a hardware configuration of the WF processing server 20 according to the first embodiment. In FIG. 3, the WF processing server 20 includes a CPU 2000, a ROM 2001, a RAM 2002, a graphics I/F 2003, a memory 2004, a communication I/F 2005, a data I/F 2006, and these components are communicably connected to each other through a bus 2020.

The memory 2004 is a non-volatile storage medium to store data, and a hard disk drive, a flash memory, or the like may be used. The memory 2004 stores a program and data used for operating the CPU 2000. Additionally, the memory 2004 stores a definition file that defines each workflow and each plugin to be used in each workflow. The memory 2004 also temporarily stores the electronic document sent from the MFP 10.

The CPU 2000 controls overall operation of the WF processing server 20 according to a program stored in advance, for example, in the ROM 2001 or the memory 2004 by using the RAM 2002 as a working memory. The graphics I/F 2003 generates a display signal that can be processed with the display 2010 based on a display control signal generated by the CPU 2000 according to the program. The display 2010 displays a screen according to the display signal provided from the graphics I/F 2003.

The data I/F 2006 sends and receives data to and from an external device. As an example of the data I/F 2006, a universal serial bus (USB) may be used. In this example, the data I/F 2006 is connected to an input device 2011. The input device 2011 is, for example, a pointing device or a key board, and outputs input information according to a user operation. The input information output from the input device 2011 is provided to, for example, the CPU 2000 through the data IF 2006. The communication I/F 2005 controls communication in association with the network 40 according to the instruction of the CPU 2000.

Figure 4:
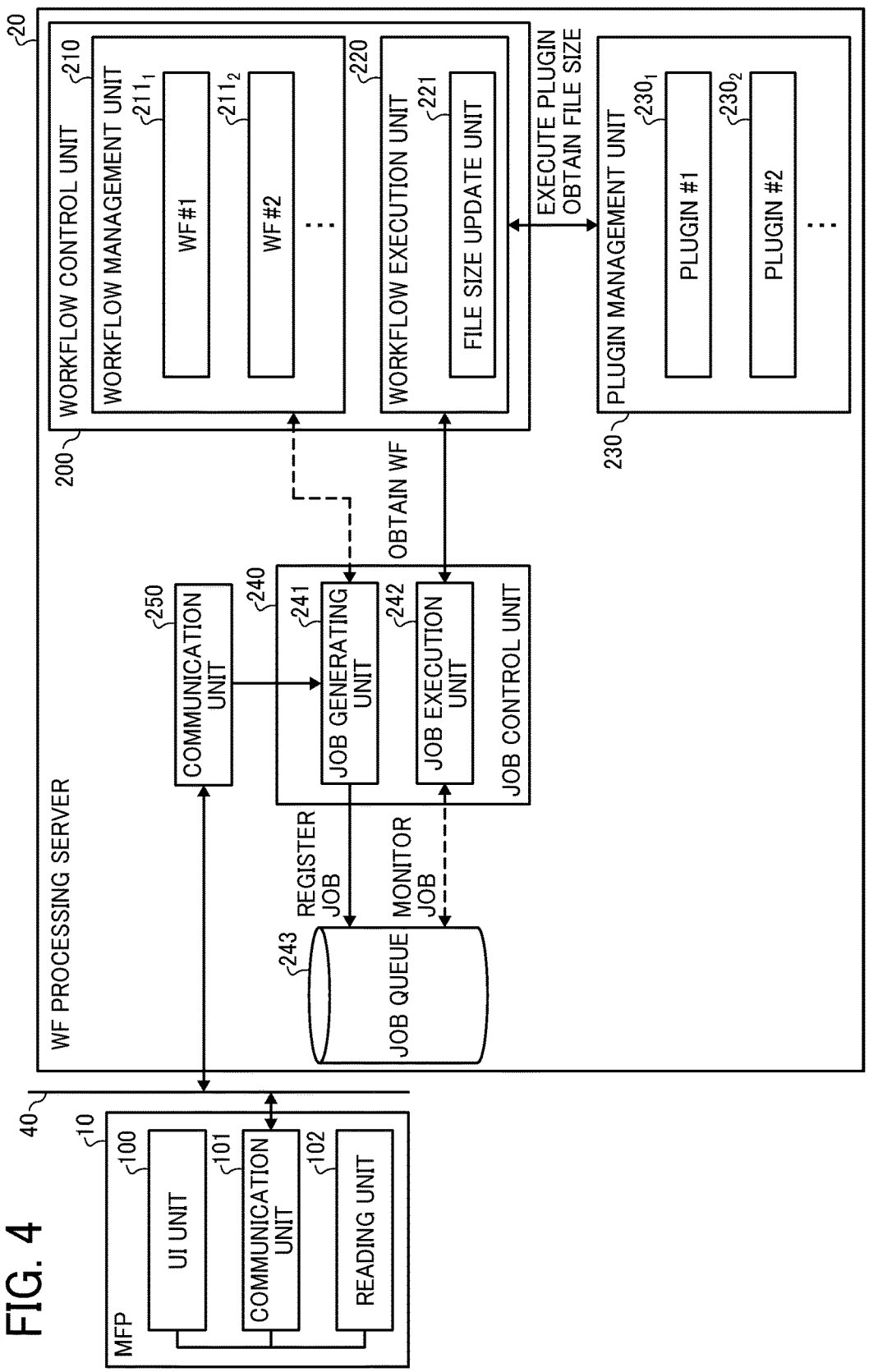
FIG. 4 is a functional block diagram illustrating the MFP and the WF processing server, according to the first embodiment.

FIG. 4 is a functional block diagram illustrating functions of the MFP 10 and the WF processing server 20 serving as an information processing device, according to the first embodiment.

The MFP 10 includes a user interface (UI) unit 100, a communication unit 101, and a reading unit 102. The UI unit 100, the communication unit 101, and the reading unit 102 are implemented by a program executed by the CPU 1000 of the MFP 10. However, this is not limiting, and alternatively a part of or all of the UI unit 100, the communication unit 101, and the reading unit 102 may be configured as a hardware circuit to operate in conjunction with each other.

The UI unit 100 generates a display screen to be displayed on the display of the control panel 1040. Additionally, the UI unit 100 receives the user operation in relation to the control panel 1040, and gives an instruction to each unit of the MFP 10 according to the user operation to control the MFP 10. The communication unit 101 controls the communication I/F 1005 to communicate with the WF processing server 20 through the network 40. The reading unit 102 controls the scanner 1031 according to, for example, an instruction of the UI unit 100 to read a document set on the platen and outputs image data obtained by reading the document.

The WF processing server 20 includes a workflow control unit 200, a plugin management unit 230, a job control unit 240, and a communication unit 250. The workflow control unit 200, the plugin management unit 230, the job control unit 240, and the communication unit 250 are implemented with an information processing program executed by the CPU 2000. However, this is not limiting, and alternatively a part of or all of the workflow control unit 200, the plugin management unit 230, the job control unit 240, and the communication unit 250 may be configured as a hardware circuit to operate in conjunction with each other.

The communication unit 250 controls the communication I/F 2005 to communicate with the MFP 10 through the network 40. A job queue 243 is configured by using a predetermined memory area in the memory 1020 or the RAM 1002, for example.

The workflow control unit 200 includes a workflow management unit 210 and a workflow execution unit 220. The workflow management unit 210 manages workflows $211_1$, $211_2$, .... In FIG. 4, the workflows $211_1$, $211_2$, ... are also presented as WF #1, #2 .... Each of the workflows $211_1$, $211_2$, ... is stored in the memory 1020 as a workflow definition file, which is described later, and managed with the workflow management unit 210.

The workflow execution unit (control unit) 220 executes designated one workflow with a job execution unit, which is described later, from the workflows $211_1$, $211_2$, ..., which are managed with the workflow management unit 210. The workflow execution unit 220 includes a file size update unit 221. The file size update unit (acquisition unit) 221 obtains a file size as the latest file size, after performing one of the processes in the workflow processing, according to the workflow executed by the workflow execution unit 220, and updates the bibliographic information with the obtained latest file size.

The plugin management unit 230 manages plugins $230_1$, $230_2$, ... respectively in association with a type of each of the plugins $230_1$, $230_2$, .... In FIG. 4, the plugins $230_1$, $230_2$, ... are also presented as plugin #1, #2 .... Each of the plugins $230_1$, $230_2$, ... is a program to perform each of the processes defined in each of the workflows $211_1$, $211_2$, ... managed with the workflow management unit 210, and stored in, for example, the memory 1020. The workflow execution unit 220 obtains a designated plugin from the plugin management unit 230 to be executed. However, this is not the limiting, and alternatively the workflow execution unit 220 may cause the designated plugin to perform a corresponding process by requesting.

Additionally, the plugins $230_1$, $230_2$, ... individually managed with the plugin management unit 230 are classified into, for example, two types including an image processing type of which the plugin performs image processing on the image data of the electronic document, and a delivery type of which the plugin performs delivery processing in relation to the electronic document. The plugin management unit 230 identifies the type of each plugin and manages the plugins $230_1$, $230_2$, ... so that one of the types is associated with each of the plugins $230_1$, $230_2$, .... The types of plugin is not limited to these two types described above, but may also include a type of plugin for archiving to perform compression cording.

The job control unit 240 includes a job generating unit 241 and a job execution unit 242. The job generating unit 241 generates job data by combining information received from the communication unit 250, information obtained from the workflow management unit 210 and the like. The job generating unit 241 stores the generated job data in the job queue 243. The job execution unit 242 periodically monitors the job queue 243, and passes the job data to the workflow execution unit 220 when obtaining the job data from the job queue 243.

The information processing program for implementing each function of the WF processing server 20 according to the first embodiment may be stored, to be provided, in a computer-readable recording medium, such as a compact disc (CD), a flexible disk (FD), and a digital versatile disk (DVD), in an installable or executable file format. However, this is not limiting, and alternatively the information processing program may be stored in a computer connected to a network such as the Internet and provided by downloading via the network. Alternatively, the information processing program may be provided or distributed via a network such as the Internet.

The information processing program may have a module configuration including each of the components described above (workflow control unit 200, plugin management unit 230, job control unit 240, and communication unit 250). As an actual hardware configuration, the CPU 2000 reads and executes the information processing program from a recording medium such as the memory 2004 and then each component is loaded to a main memory device such as the RAM 2002 to generate the workflow control unit 200, the plugin management unit 230, the job control unit 240, and the communication unit 250 on the main memory device.

Processing According to First Embodiment

Next, a detailed description of the processing according to the first embodiment is given below. Prior to the processing according to the first embodiment, a workflow is set. For example, a manager of the information processing system 1 sets the workflow using the WF processing server 20, for example. However, this is not limiting, and the workflow may be set using another computer connected to the network 40.

FIG. 5 is an illustration of an example of a workflow setting screen according to the first embodiment. The workflow setting screen 500 illustrated in FIG. 5 is displayed on the display 2010 of the WF processing server 20, for example. In FIG. 5, the workflow setting screen 500 includes setting areas 501 and 502 and buttons 503 and 504.

The setting area 501 is an area for setting the processes and an order of the processes performed in each workflow. In the example of FIG. 5, a start point 510 and plugins P1 to P5 each of which corresponds to one of the processes are presented with corresponding icon images arranged in an order of being performed in the setting area 501, and present a framework of a workflow 211a. The plugins P1 to P5 in the workflow 211a are sequentially executed according to arrows illustrated in the setting area 501 from the start point 510 to the right in the drawing.

In the example of FIG. 5, the plugin P1, which is for performing image correction, (image correction plugin P1) is arranged immediately after the start point 510, and followed by the plugin P2, which is for performing portable document format (PDF) conversion (PDF conversion plugin P2). That is, image data input at the start point 510 is processed with the image correction plugin P1 for image correction, and converted in a PDF format with the PDF conversion plugin P2.

Following the plugin P2, the decision plugin P3 (presented as "Decision Point" in the figure), in which of a plurality of next processes is executed is determined according to a particular condition, is disposed. In the example of FIG. 5, the decision plugin P3 determines a plugin executing the process following the plug in P4 and the plugin P5 according to the condition designated. Note that the plugin P4 is a plugin for a mail delivery and the plugin P5 is a plugin for a folder delivery.

For example, the WF processing server 20 causes the display 2010 to display a tool box, in which a list of icon images each corresponding to one of the plugins 2311, 2312, . . . managed with the plugin management unit 230 is presented, and the workflow setting screen 500. The user arranges in the setting area 501 the icon images corresponding to the plugins P1 to P5 used in the workflow 211a from a tool box by a drag and drop operation using the pointing device, for example. Additionally, the user can perform an edit operation to change the order of processes of the plugins P1 to P5, which are previously arranged in the setting area 501 by moving the icon images individually corresponding to the plugins P1 to P5 by the drag and drop operation using the pointing device, for example.

In FIG. 5, the setting area 502 is for setting in relation to a designated one of the plugins P1 to P5, which are displayed as the icon images in the setting area 501. In the example of FIG. 5S, the plugin P3, which is for determination (decision plugin P3), is designated in the setting area 501, and input areas 520 to 525 and buttons 526 and 527 used for setting conditions in relation to the decision plugin P3, which are designated, are arranged in the setting area 502.

The buttons 526 and 527 are respectively provided for adding and deleting a condition. The buttons 526 and 527 respectively allow user to instruct to delete a series of conditions displayed in a right side with a state of a "negative" (−) indication and to add a condition with a state of a "positive" (+) indication. Additionally, with the input area 520, one of logical addition and logical conjunction applied for a plurality of conditions is input when the plurality of conditions are indicated in the setting area 502.

The decision plugin P3 (hereinafter, appropriately referred to as a plugin of "Decision Point") is briefly described below. The plugin of "Decision Point" checks the designated condition and determines which one of the plugins is executed next. For example, in the setting area 502, the input area 521 is input with an item used for the determination, and the input areas 522 and 523 are individually input with targets for the determination in relation to the item input to the input area 521. The input areas 524 and 525 are input in relation to a condition for the determination.

In the example of FIG. 5, "ratio" is input to the input area 521, and "file size (latest)" and "file size (original)" are respectively input to the input area 522 and the input area 523. This indicates that the plugin of "Decision Point" determines with a condition based on a rate of the latest file size to the original file size. Additionally, an inequality sign, "<", is input to the input area 524 and a value, "0.5", is input to the input area 525. Accordingly, the condition for the determination, in the plugin of "Decision Point", is indicated whether the rate of the targets input to the input area 522 and the input area 523 is equal to or less than "0.5".

The plugin of "Decision Point" outputs a value of "true" when the condition is satisfied with a result of the determination, and outputs a value of "false" when the condition is not satisfied with a result of the determination. Icon images 511a and 511b arranged immediately after the decision plugin P3 in the setting area 501 are respectively corresponding to the values "true" and "false", which are indicated as a result of the determination of the plugin of "Decision Point".

Additionally, input areas are arranged in the setting area 502 according to one of the plugins designated in the setting area 501.

In the workflow 211a set as illustrated in FIG. 5, the image correction and the PDF conversion are sequentially performed on the image data of the electronic document input at the start point 510, with the plugin P1 and plugin P2, respectively. In the workflow 211a, the decision plugin P3 compares the file size of the electronic document after the PDF conversion with the plugin P2 (latest file size) and the file size of the electronic document input at the start point 510 (original file size). In the workflow 211a, based on a result of the comparison with the decision plugin P3, the next process is determined from a mail delivery process with the plugin P4 and a folder delivery process with the plugin P5 according to whether the rate of the latest file size to the original file size is equal to or less than the value of "0.5".

In FIG. 5, the information input to the setting areas 501 and 502 is confirmed using the button 503. For example, when the button 503 is operated, the workflow definition information is generated based on information on the workflow 211a input to the setting area 501 and stored in a corresponding one of the workflow definition files. When the button 503 is operated, plugin definition information corresponding to each of the plugins P1 to P5 involved in the workflow 211a, which is input to the setting area 501, is further generated based on a value input to the setting area 502 corresponding to each plugin, and stored in plugin definition files.

FIG. 6 is an illustration of an example of the workflow definition information corresponding to the workflow 211a illustrated in the setting area 501 of FIG. 5, according to the first embodiment.

In FIG. 6, and FIG. 8 and FIG. 11, which are described later, a number arranged at the top in individual row indicates a row number used for explaining, and a colon (:), which follows the row number, separates the row number from a code indicating a data part, which comes after the colon, unless there is a specific statement to the contrary. In this example, the workflow definition information is described using an extensible markup language (XML) that is a type of markup languages to define and describe a meaning and a configuration of data using a tag. This is, however, merely one example of methods of describing the workflow definition information and not limiting. For example, the workflow definition information may be described with java script (registered trademark) object notation (JSON) or in a binary format.

In FIG. 6, Row 1 defines an XML version with which the data is described and an encoding method. The workflow 211a is described between a start tag of "<flow>" in Row 3 and an end tag of "</flow>" in Row 19, which are between a start tag of "<flows>" in Row 2 and an end tag of "</flows> in Row 20.

Additionally, in the workflow definition information, a description of "nextPlugin" indicates a definition of a plugin to be executed next, and a description of "id=" " " following the description of "nextPlugin" describes, in quotation marks, " ", identification information (ID) of the plugin to be executed next.

In a description from Row 4 to Row 16, the start point 510 is defined from Row 4 to Row 6 with a start tag of "<startpoint>" and an end tag of "</startpoint>", and an ID of "@ImageProcessingToolbox" of a plugin that is to be executed next to the start point 510 is described in Row 5 between the start tag of "<startpoint>" and the end tag of "</startpoint>". That is, the description of "nextPlugin"

indicates a definition of a plugin to be executed next is shown there, and an ID of the plugin to be executed next is described between a symbol of "<" indicating a start (start symbol "<") and a symbol of "/>" indicating an end (end symbol "I>"), which are a pair, after the description of "nextPlugin" and following a description of "id=".

From Row 7, each plugin is defined using a start tag, "<plugin>" ("<plugin id= . . . >), and an end tag, "</plugin>".

From Row 7 to Row 9, the image correction plugin P1 is defined. With the start tag of "<plugin id= . . . > in Row 7, an ID, "@ImageProcessingToolbox", a type, "filter", and a display name, "image correction", of this plugin are described using descriptions of "id=", "type=", and "displayName", respectively. The display name is used for displaying in the setting area 501. Additionally, in Row 8, which is between the start tag "<plugin id= . . . >" and the end tag "</plugin>", an ID, "@RPDEFConverter", of a plugin to be executed next to the plugin mentioned above is described with the description of "nextPlugin".

From Row 10 to Row 12, the PDF conversion plugin P2 is defined. With the start tag of "<plugin id= . . . >" in Row 10, an ID, "@RPDFConverter", the type, "filter", and a display name, "PDF conversion" are described. Additionally, an ID, "@DecisionPoint", of a plugin to be executed next to the plugin P2 is described between the start tag of "<plugin id= . . . >" and the end tag of "</plugin>" in Row 11.

The decision plugin P3 is defined from Row 13 to Row 16. With the start tag of "<plugin>" in Row 13, the ID, "@DecisionPoint", the type, "filter", and a display name, "Decision Point" are described.

Additionally, in a case of the decision plugin P3, Row 14 and Row 15, which are between the start tag "<plugin id= . . . >" and the end tag "</plugin>", individually describe the ID of a plugin to be executed next according to a result of the determination, which is indicated as one of the values "true" and "false".

More specifically, Row 14 describes "@ToSMTP", which is an ID of a plugin to be executed next, and "decision="true"" to indicate that the plugin having the ID of "@ToSMTP" is executed when a result of the determination is the value of "true". Similarly, Row 15 describes "@ToFolder", which is an ID of another plugin to be executed next, and "decision="false"" to indicate that the plugin having the ID of "@ToFolder" is executed when a result of the determination is the value of "false".

The mail delivery plugin P4 and the folder delivery plugin P5 are defined in Row 17 and Row 18, respectively. In Row 18, the ID, "@ToSMTP", a type, "output", and a display name, "mail delivery" are described between the start symbol "<" and the end symbol "/>". Similarly, Row 19 describes the ID, "@ToFolder", the type, "output", and a display name, "folder delivery" between the start symbol "<" and the end symbol "/>".

The workflow execution unit 220 reads the workflow definition file storing the workflow definition information described in a way as described above and interprets the workflow definition information. The workflow execution unit 220 detects the start tag of "<startpoint>" and the end tag of "</startpoint>" that define the start point 510 from the workflow definition information, and obtains the ID, "ImageProcessingToolbox" of the plugin to be executed next according to the description of "nextPlugin".

The workflow execution unit 220 searches the obtained ID of "@ImageProcessingToolbox" from the workflow definition information, and reads the plugin identified with the ID of "@ImageProcessingToolbox" from the plugin management unit 230 to execute the plugin. When completing the execution of the plugin, the workflow execution unit 220 obtains the ID of "@RPDFConverter" (Row 8) of the plugin to be executed next to the plugin having the ID of "@ImageProcessingToolbox", and similarly reads the plugin identified with the ID of "@RPDFConverter" from the plugin management unit 230 to be executed. When completing the execution of the plugin, the workflow execution unit 220 obtains the ID of "@DecisionPoint" (Row 11) of the plugin to be executed next to the plugin having the ID of "@RPDFConverter".

The workflow execution unit 220 reads the plugin identified with the ID, "@DecisionPoint" from the plugin management unit 230 and executes the read plugin. At this time, the workflow execution unit 220 acquires a file size (latest file size) obtained after executing the plugin having the ID of "@RPDFConverter", which is executed immediately before, and the original file size, and performs determination according to the conditions set in the setting area 502.

The workflow execution unit 220 obtains the ID, "@ToSMTP", of the plugin to be executed next, according to the description of "decision="true"" (Row 14) when the conditions are determined to be satisfied. On the other hand, when the conditions are determined not to be satisfied, the workflow execution unit 220 acquires the ID, "@ToFolder", of the plugin to be executed next according to the description of "decision="false"" (Row 15). The workflow execution unit 220 reads one of the plugins identified with the ID acquired according to the result of the determination from the plugin management unit 230 and executes the read plugin.

A detailed description of the processing of the MFP 10 and the WF processing server 20 according to the first embodiment is described with reference to FIGS. 7 to 12.

Figure 7:
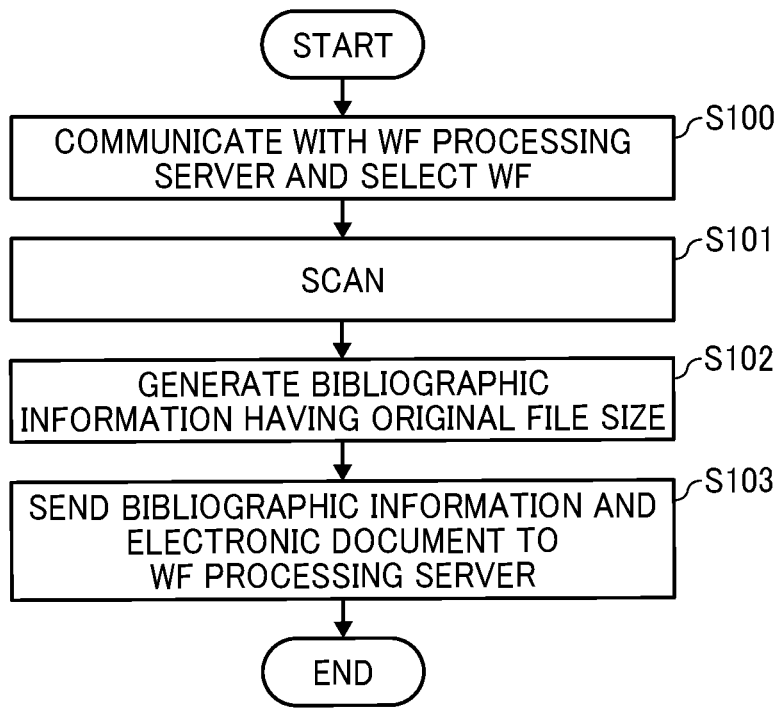
FIG. 7 is a flowchart illustrating example processing performed by the MFP 10 according to the first embodiment.

FIG. 7 is a flowchart illustrating example processing performed by the MFP 10 according to the first embodiment. In S100, the UI unit 100 communicates with the WF processing server 20 using the communication unit 101, selects one of the workflows (WF) to be applied, and sends information indicating the selected workflow to the WF processing server 20 using the communication unit 101

For example, the UI unit 100 communicates with the WF processing server 20 using the communication unit 101, and requests a list of workflows. The WF processing server 20 obtains the list of the workflows $211_1$, $211_2$, . . . from the workflow management unit 210 in response to the request received, and sends the obtained list to the MFP 10. The communication unit 101 receives the list and passes to the UI unit 100 in the MFP 10. The UI unit 100 causes the control panel 1040 to display the list. The UI unit 100 selects one of the workflows $211_1$, $211_2$, . . . included in the list according to a user operation in association with the control panel 1040. The UI unit 100 sends the information (e.g., ID) indicating the selected workflow to the WF processing server 20 via the communication unit 101.

At the next step, S101, in response to the user operation to the control panel 1040, the UI unit 100 instructs the reading unit 102 to cause the scanner 1031 to scan. At this time, the UI unit 100 receives various types of setting values in association with the scanning input from the control panel 1040. The reading unit 102 controls the scanner 1031 according to the instruction, and scans and reads an image of the document set on the platen according to the input various setting values. The reading unit 102 stores the image data, which is obtained by reading the document, in a file, and stores in, for example, the memory 1020. This file is an electronic document storing the image data of the document.

In the next step, S102, the UI unit 100 generates bibliographic information including a file size of the electronic document read and stored in the memory 1020 at S101. This file size is the original file size of the electronic document.

In the next step, S103, the UI unit 100 sends the bibliographic information generated in S102, the electronic document stored in the memory 1020 in S101, and each type of setting value input in association with the scan to the WF processing server 20 using the communication unit 101.

FIG. 8 is an illustration of an example of a part of the bibliographic information generated in S102. Referring to FIG. 8, Row 1 defines an XML version with which the data is described and an encoding method. Row 2 indicates the bibliographic information with a start tag of "<document>", and contents of the bibliographic information is described between the start tag of "<document>" and an end tag of "</document>" in Row 26.

In Row 5, which is between a start tag of "<content>" in Row 3 and an end tag of "</content>" in Row 9, information indicating a file name and a pass name of the electronic document in association with the original electronic document is described following a description of "path=". In this example, the file name and the pass name is described as "scan_001.tif".

Pieces of property information (properties) of the electronic document associated with this bibliographic information are described between a start tag of "<properties>" in Row 10 and an end tag of "</properties>" in 25 Row in a manner that each piece of property information is described between a start tag of "<property id=" ">" and an end tag of "</property>. In a pair of symbols "" " "in the start tag "<property id=" ">", an ID of each piece of property information is described.

In this example, as illustrated as a property 600 of the properties, a start tag of "<property id="contentSize">" in Row 21 indicates a description of a file size of the electronic document, and a value of the file size, "425736 (byte)", is described between a start tag of "<value>" and an end tag "</value>" in Row 22. The file size described with the start tag of "<proerty id="contentSize">" is the original file size of the electronic document.

Figure 9:
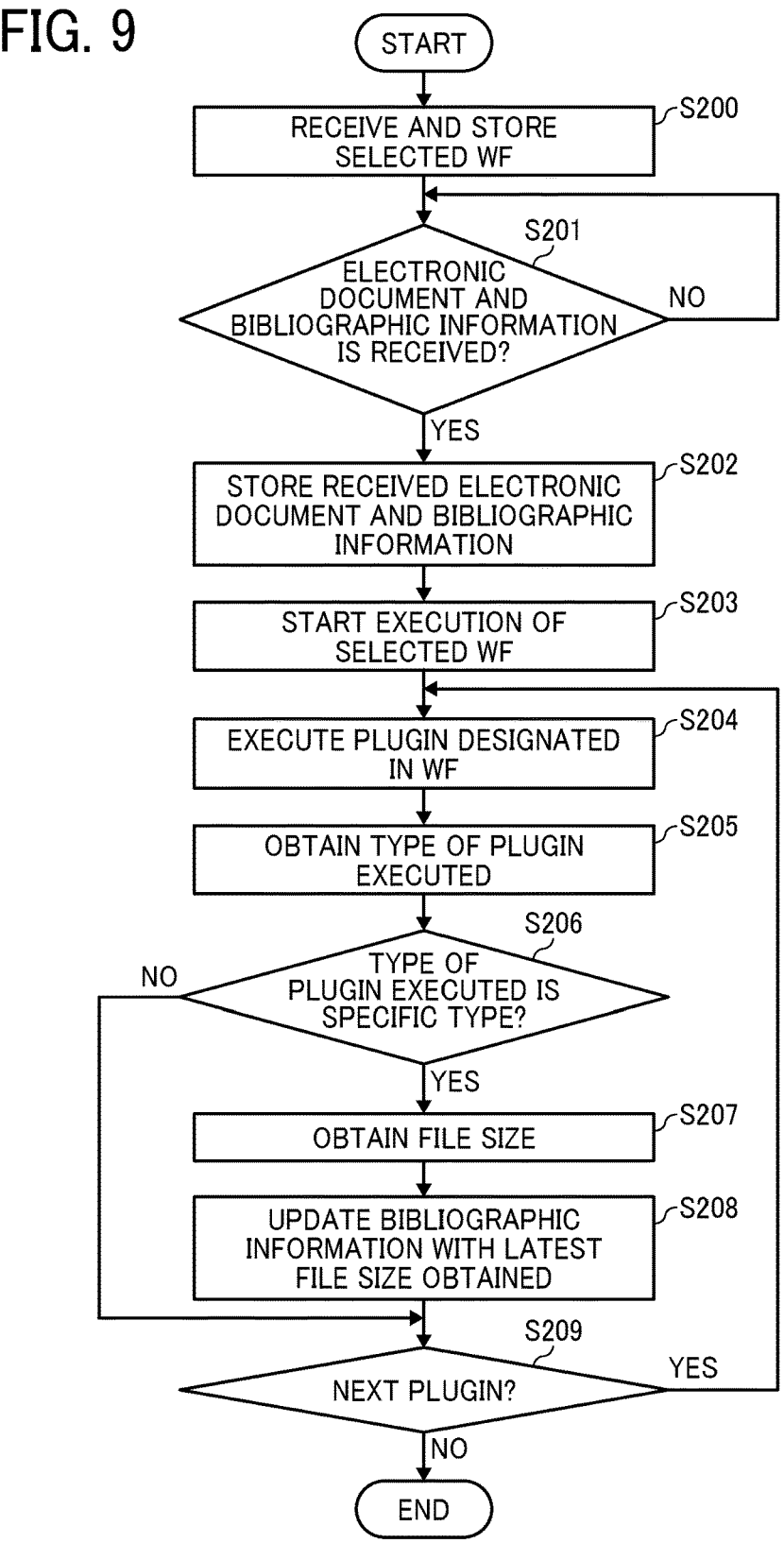
FIG. 9 is a flowchart illustrating example processing performed by the WF processing server according to the first embodiment.

FIG. 9 is a flowchart illustrating example processing performed by the WF processing server 20 according to the first embodiment, which corresponds to the operation of the MFP 10 illustrated in the flowchart of FIG. 7. The WF processing server 20 receives and stores the information indicating the selected workflow sent from the MFP 10 in S100 of FIG. 7. For example, the WF processing server 20 receives the information indicating the workflow sent from the MFP 10 with the communication unit 250. The communication unit 250 temporarily stores the received information indicating the workflow in the RAM 2002, for example.

In the next step, S201, the WF processing server 20 determines whether the electronic document and the bibliographic information is received as a set from the MFP 10. When the WF processing server 20 determines that the electronic document and the bibliographic information sent from the MFP 10 is not received (S201: NO), the processing returns to S201 and the WF processing server 20 waits for the electronic document and the bibliographic information sent from the MFP 10.

When the WF processing server 20 determines that the electronic document and the bibliographic information sent from the MFP 10 is received (S201: YES), the processing continues to S202. At this time, the WF processing server 20 receives the various types of setting values in association with the scanning along with the electronic document and the bibliographic information sent from the MFP 10. In S202, the WF processing server 20 stores the electronic document, the bibliographic information, and the various types of setting values.

More specifically, in the WF processing server 20, the communication unit 250 receives the electronic document, the bibliographic information, and then the various types of setting values sent from the MFP 10, and passes the electronic document, the bibliographic information, and the various types of setting values to the job generating unit 241. In addition, the communication unit 250 passes the information indicating the selected workflow received from the MFP 10 and stored in S200 to the job generating unit 241.

The job generating unit 241 obtains the workflow definition file from the workflow management unit 210 according to the information indicating the workflow, which is passed from the communication unit 250. The job generating unit 241 generates job data by combining the electronic document, the bibliographic information, and the various types of setting values, passed from the communication unit 250 and the workflow definition file obtained. The job generating unit 241 stores the generated job data in the job queue 243.

Figure 10:
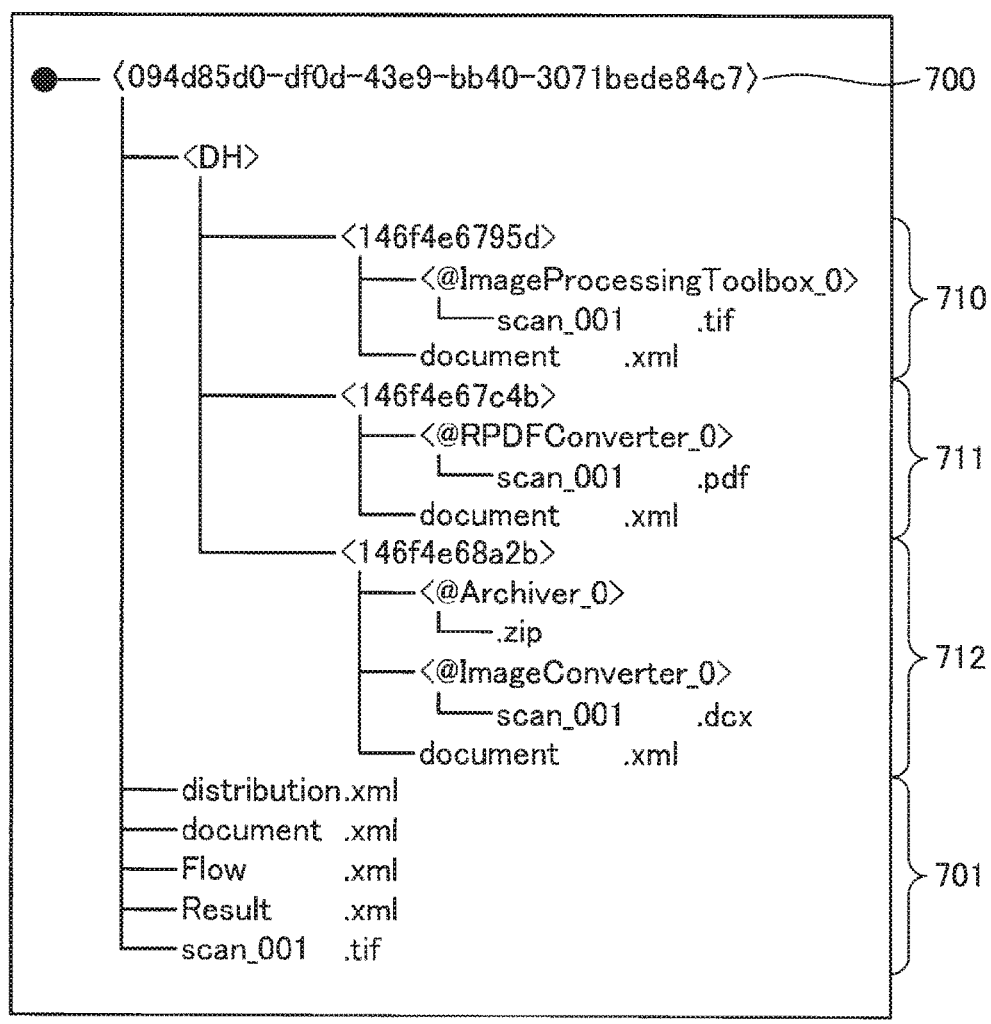
FIG. 10 is an illustration of an example configuration of job data according to the first embodiment.

FIG. 10 is an illustration of an example configuration of the job data stored in the job queue 243, according to the first embodiment. The job data is stored in the job queue 243 using a folder structure, for example. In FIG. 10, a folder 700 that stores the job data is generated and a folder name in relation to the folder 700 is uniquely generated and given, in the job queue 243. Additionally, a group of files 701 is stored directly under the folder 700. Each folder name, such as the folder name for the folder 700 as illustrated, is not actual data to be stored in the folder, but used for explaining the job data of FIG. 10 for ease of understanding.

In the example of FIG. 10, the group of files 701 includes a file of "distribution.xml", a file of "document.xml", a file of "Flow.xml", a file of "Result.xml", and the file of "scan_001.tif".

Additionally, a string of characters after a separator of ". (period)" in each file name is an extension indicating a type of the file, and an extension of "xml" indicates that the file is an XML file. An extension, "tif", indicates that the file presents image data in a tagged image file (TIF) format. Another extension, "pdf", indicates that the file is image data in a PDF format, and still another extension, "zip", indicates that the file is an archive file in a zip archive format. Additionally, still another extension, "dcx", indicates that the file is multi pages of image file.

The file, "scan_001.tif", is a file that stores the image data and configures the electronic document. The file, "document.xml", is a bibliographic information file that stores the bibliographic information corresponding to the file of "scan_001.tif", which is described above with reference to FIG. 8. That is, the job queue 243 is a memory unit that stores the bibliographic information. The file, "Flow.xml", is one of the workflow definition files that stores the workflow definition information described above with reference to FIG. 6, and stores the workflow definition information selected in the MFP 10. The file, "distribution.xml" is a plugin definition file corresponding to each plugin included in the file of "Flow.xml", and reflects contents set in the setting area 502 of FIG. 5 described above. The file, "Result.xml" stores information indicating a result of execution of each plugin executed according to the file of "Flow.xml".

Additionally, in FIG. 10, a folder, "DH", formed directly under a router stores folders 710, 711, and 712 each used as a work area of the corresponding plugin executed according to the file of "Flow.xml". Alternatively, each of folders 710, 711, and 712 may be generated directly under the folder 700 without the folder, "DH". Each of folders 710, 711 and 712 stores a file that stores the image data generated from the file of "scan_001.tif" due to the execution of the specific type of plugin of the plugins included in the file of "Flow.xml", for example.

In a subsequent step, S203, the WF processing server 20 executes the workflow selected in the MFP 10. More specifically, in the WF processing server 20, the job execution unit 242 periodically monitors the job queue 243 that stores the job data. When obtaining the job data from the job queue 243, the job execution unit 242 passes the job data to the workflow execution unit 220.

The workflow execution unit 220 retrieves information indicating the workflow from the job data passed. The workflow execution unit 220 designates the workflow according to the information retrieved from the job data and obtains the workflow definition file of the designated workflow from the workflows $211_1$, $211_2$, . . . managed in the workflow management unit 210. The workflow execution unit 220 starts executing the workflow from the start point 510 described in the obtained workflow definition file.

In the subsequent step, S204, the workflow execution unit 220 performs one of the processes due to corresponding one of the plugins designated in the workflow according to the workflow definition information stored in the workflow definition file. More specifically, the workflow execution unit 220 obtains the one of the plugins $230_1$, $230_2$, . . . managed in the plugin management unit 230 according to an order of executing the plugins indicated in the workflow definition information. The workflow execution unit 220 processes the image data of the electronic document retrieved from the job data, namely the image data stored in the file of "scan_001.tif", with the plugin obtained from the plugin management unit 230.

In the following step, S205, the workflow execution unit 220 obtains information indicating a type of the plugin executed in S204 from the plugin management unit 230. In the following step. S206, the workflow execution unit 220 determines whether the plugin executed in S204 is the specific type of plugin based on the obtained information indicating the type of the plugin.

The specific type of plugin is, for example, a type of plugin for performing image processing on the image data of the electronic document. In the example of FIG. 5 described above, the image correction plugin P1 and the PDF conversion plugin P2 are determined to be the specific type of plugin. On the other hand, the decision plugin P3, the mail delivery plugin P4, and the folder delivery plugin P5 are determined not to be the specific type of plugin, because the file size does not change.

The specific type of plugin is not limited to this, however, the specific type of plugin may include a type of plugin that has a possibility to change the file size of the electronic document. In this case, a plugin that performs image conversion such as the PDF conversion plugin P2 of the plugins for performing the image processing and a plugin that performs archiving or compression coding of the file can be included in the specific type of plugin.

The workflow execution unit 220 continues the processing to S209 when determining the executed plugin is not the specific type of plugin in S206 (S206: NO). On the other hand, the workflow execution unit 220 continues the processing to S207 when determining that the executed plugin is the specific type of plugin in S206 (S206: YES).

In S207, the workflow execution unit 220 obtains a current file size of the electronic document that is processed due to the plugin in S204 using the file size update unit 221. In the following step, S208, the file size update unit 221 updates the bibliographic information with the file size in S207 as the latest file size.

FIG. 11 is an illustration of an example of the bibliographic information, in which a property 601 indicating the latest file size is added to the bibliographic information illustrated in FIG. 8. In FIG. 11, the latest file size of the electronic document is described with the start tag of "<property id="latestContentSize">" in Row 24, and a value of the file size, "190773 (byte)", is described between the start tag of "<value>" and the end tag of "</value>" in Row 25. In the property 601, the file size described with the start tag of "<property id="latestContentSize">" is the latest file size of the electronic document.

Additionally, in FIG. 11, the original file size is described between the start tag of "<property id=contentSize">" in Row 21 and the end tag of "</property>" in Row 23 in the property 600. Accordingly, the original file size and the latest file size can be obtained by referring the bibliographic information illustrated in FIG. 11.

Additionally, when the property 601 indicating the latest file size is previously added to the bibliographic information, the file size update unit 221 updates the value of the file size described between the start tag of "<value>" and the end tag of "</value>" in the property 601 with a value of the latest file size obtained in S207.

In the subsequent step, S209, the workflow execution unit 220 determines whether there is a plugin to be executed next according to the workflow definition information. The workflow execution unit 220 returns the processing to S204 when determining that there is the plugin to be executed next and executes the next plugin (S209: YES).

On the other hand, the workflow execution unit 220 completes the processing illustrated in the flowchart of FIG. 9 when determining that there is no plugin to be executed next in S209.

In the description above, the workflow execution unit 220 obtains the information indicating the type of plugin to be executed from the plugin management unit 230 and determines whether the plugin is the specific type of plugin or not in S206, however, the embodiment is not limited to this example.

Alternatively, for example, the workflow execution unit 220 may manage a list of IDs in association with the specific type of plugin that requires obtaining a file size, and determining whether a plugin is the specific type by checking whether an ID of the plugin to be executed is included in the list. Yet alternatively, the workflow definition information of FIG. 6 may include a description of a type of the plugin. In this case, the workflow execution unit 220 refers the workflow definition information and determines whether a plugin is the specific type based on the description indicating the type of plugin included in the workflow definition information when executing a process due to the designated plugin.

Figure 12:
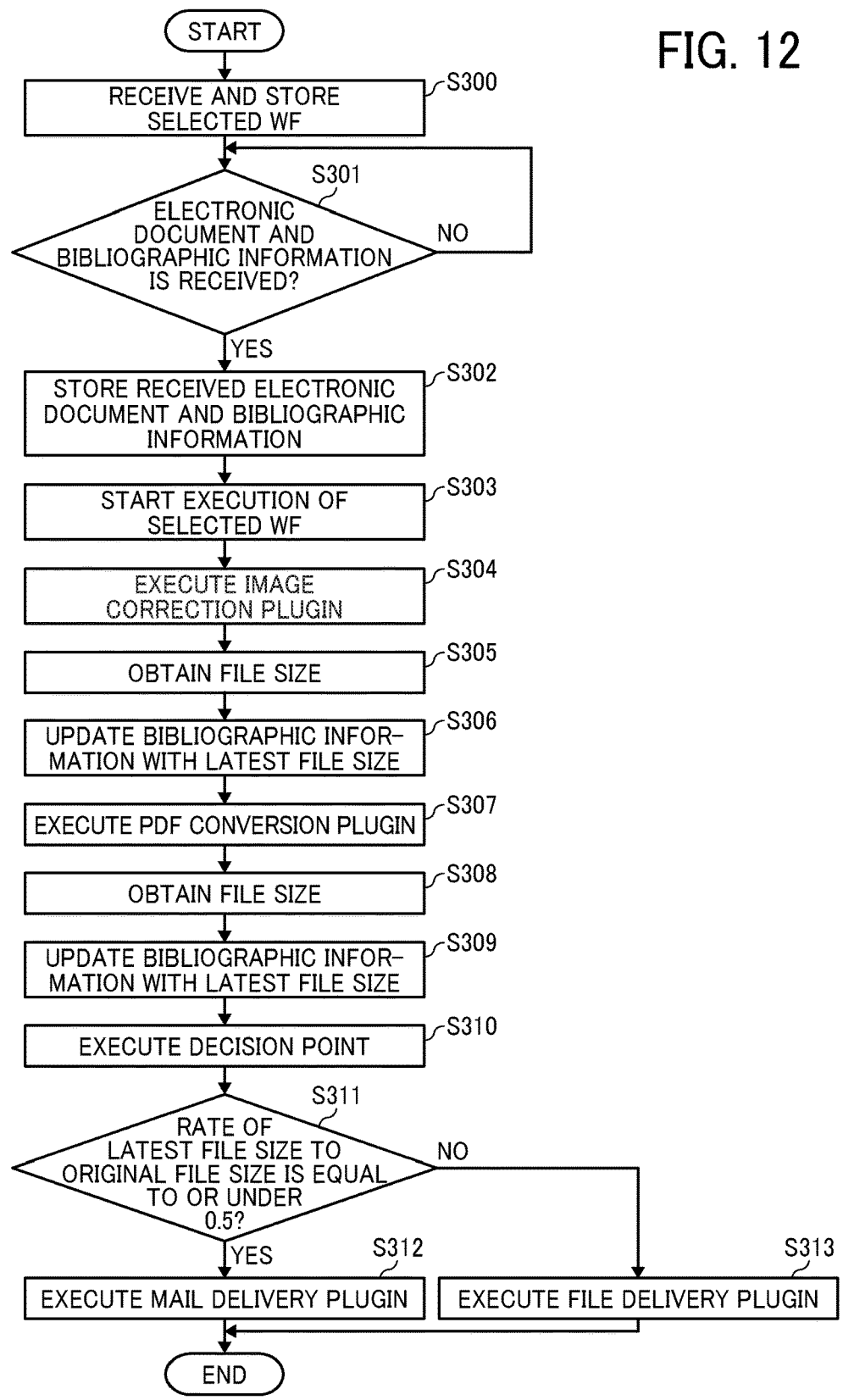
FIG. 12 is a flowchart illustrating example processing in which a more specific example is applied, according to the first embodiment.

FIG. 12 is a flowchart illustrating example processing performed by the WF processing server 20 in which a more specific example is applied to the processing illustrated in the flowchart of FIG. 9, according to the first embodiment. In the processing illustrated in FIG. 12, the processing of the flowchart of FIG. 9 is applied to the workflow 211*a* that is set in the setting areas 501 and 502 of FIG. 5. The processing performed by the MFP 10 is the same as the process described above with reference to FIG. 7 and the description thereof is omitted below.

In FIG. 12, the steps from S300 to S304 are substantially the same as the steps from S200 to S204 in the flowchart of FIG. 9. That is, in S300, the WF processing server 20 receives and stores the selected workflow 211a sent form the MFP 10. In the subsequent step, S301, the WF processing server 20 determines whether the electronic document and the bibliographic information, as a set, is received from the MFP 10. The WF processing server 20 returns the processing to S301 when determining that the electronic document and the bibliographic information is not received (S301: NO). The WF processing server 20 continues the processing to S302 when determining that the electronic document and the bibliographic information is received.

In S302, in the WF processing server 20, the job generating unit 241 generates job data by combining the electronic document, the bibliographic information, and the various types of setting values, which are received, and the workflow definition file obtained from the workflow management unit 210 based on the information indicating the workflow 211a stored in S300. The job generating unit 241 stores the generated job data in the job queue 243. The job generating unit 241 generates, in relation to the job queue 243, the folder 700 that is unique to the generated job data and stores each file (group of files 701) configuring the job data in the job queue 243 (see FIG. 10). At this time, the job generating unit 241 stores the group of files 701 directly under the folder 700.

In the next step, S303, the workflow execution unit 220 starts executing the workflow according to the workflow definition information in the workflow definition file of the workflow designated based on the job data passed from the job execution unit 242. Here, the plugins P1 to P5 are executed according to the order set in the workflow 211a set in the workflow setting screen 500 of FIG. 5.

In the next step, S304, the workflow execution unit 220 performs the image correction on the image data of the electronic document using the image correction plugin P1 based on the description of the workflow definition information. The workflow execution unit 220, then, passes the electronic document on which the image correction is processed to the job execution unit 242. The job generating unit 241 generates the folder "DH" directly under the folder 700 of the workflow stored in the job queue 243 and newly generates the folder 710 directly under the folder, "DH" (see FIG. 10). The job execution unit 242 stores the electronic document on which the image correction is performed in S304, as the file of "scan_001.tif". Additionally, the job generating unit 241 generates the bibliographic information according to the electronic document on which the image correction is performed and stored in the folder 710.

In the example of FIG. 10, the electronic document stored in the folder 710 is the file of "scan_001.tif" in which the file name and the file size is the same as the original file of "scan_001.tif" included in the group of files 701.

In the next step, S305, the file size update unit 221 obtains the latest file size that is the file size of the electronic document (file of "scan_001.tif") on which the process of 304 is performed. In the next step, S306, the file size update unit 221 updates the bibliographic information stored as the job data in S302 with the latest file size obtained in S305.

In the subsequent step, S307, the workflow execution unit 220 processes the image data of the electronic document on which the image correction is performed in S304 with the PDF conversion plugin P2 according to the description of the workflow definition information to convert a format of the electronic document into a PDF format. That is, the workflow execution unit 220 performs the PDF conversion on the stored file of "scan_001.tif" on which the image correction is performed in S304.

The workflow execution unit 220 passes the electronic document on which the PDF conversion is performed to the job execution unit 242. The job generating unit 241 newly generates a folder 711 directly under the folder "DH" of the workflow, which is stored in the job queue 243 (see FIG. 10). The job execution unit 242 stores the electronic document on which the PDF conversion is performed in S307 in the folder 711 as a file, "scan_001.pdf".

As described above, the extension in the file name of the electronic document on which the PDF conversion is performed is, at least, changed. Additionally, with the PDF conversion, image processing in which, for example, a blank page is removed can be performed on the image data, and the file size may change after this processing.

The job generating unit 241 generates the bibliographic information corresponding to the electronic document on which the PDF conversion is processed in the same way as described above and stores the bibliographic information in the folder 711.

In the subsequent step, S308, the file size update unit 221 obtains the latest file size that is the file size of the electronic document (file of "scan_001.pdf") on which the process of 307 is performed. In the next step, S309, the file size update unit 221 further updates the bibliographic information that is previously updated in S306 with the latest file size that is obtained in S308.

In the next step, S310, the workflow execution unit 220 executes the processing with the decision plugin P3 according to the workflow definition information.

By referring to the information of FIG. 11, the workflow execution unit 220 executes the decision plugin P3, obtains a rate of the latest file size described as the property 601 to the original file size described as the property 600 included in the bibliographic information according to the conditions set in the setting area 502 of FIG. 5. In the next step, S311, the workflow execution unit 220 determines whether the rate obtained in S310 is equal to or less than "0.5" according to the conditions set in the setting area 502 of FIG. 5, by executing the decision plugin P3.

When the workflow execution unit 220 determines that the rate is equal to or less than "0.5" (S311: YES"), the processing continues to S312. In S312, the workflow execution unit 220 executes the mail delivery plugin P4, as illustrated with the icon image 511a in the setting area 501 of FIG. 5, according to the description of the workflow definition information, to perform the mail delivery of the electronic document. Through this, the electronic document is transferred to the mail server 31 and the electronic document is sent to a designated mail address.

On the other hand, when the workflow execution unit 220 determines that the rate is over "0.5" (S311: NO), the processing continues to S313. In S313, the workflow execution unit 220 executes the folder delivery plugin P5, as illustrated with the icon image 511b in the setting area 501 of FIG. 5, according to the description of the workflow definition information, to perform the folder delivery of the electronic document. Through this, the electronic document is transferred to the document management server 30 and the electronic document is sent to a designated folder.

When S312 or S313 is completed, the processing illustrated in the flowchart of FIG. 12 is completed.

As described above, according to the first embodiment, the original file size and the latest file size are generally included in the bibliographic information. This allows each plugin to refer the original file size and the latest file size easily in executing the workflow. Additionally, the workflow execution unit 220, which executes the workflow, but not each plugin, updates the latest file size included in the bibliographic information. Accordingly, updating of the file size is hardly missed even when a new plugin is added in the plugin management unit 230.

Modification of First Embodiment

In the description above, the determination in the decision plugin P3 is performed using the original file size and the latest file size, however this is not limiting. According to a modification of the first embodiment, the determination in the decision plugin P3 may be performed using one of the original file size and the latest file size.

It is assumed that there is limitation to a file size of the electronic document to be delivered by mail delivery (for example, 3 megabytes (MB)). Additionally, regarding the PDF conversion, one of a standard compression mode in which the file size is compressed to more or less 70 percent of its original size, and a high compression mode in which the file size can be compressed further smaller than that in the standard compression mode, can be selected.

As a first example, the processing can branch in the decision plugin P3 according to whether the original file size is over a predetermined value, for example, a value larger than an upper limit of the mail delivery (e.g., 4 MB). In this case, for example, when a result of the determination is "true", namely the original file size is over the predetermined value, the PDF conversion in the high compression mode is performed, and when the result of the determination is "false", namely the original file size is equal to or less than the predetermined value, the PDF conversion in the standard compression mode is performed.

As a second example, the processing can branch in the decision plugin P3 according to whether the latest file size is over an upper limit that is attachable to a mail in the mail delivery. In this case, for example, when a result of the determination is "true", namely the latest file size is over the upper limit, the folder delivery is performed, and when the result of the determination is "false", namely the latest file size is equal to or less than the upper limit, the mail delivery is performed.

Figure 13:
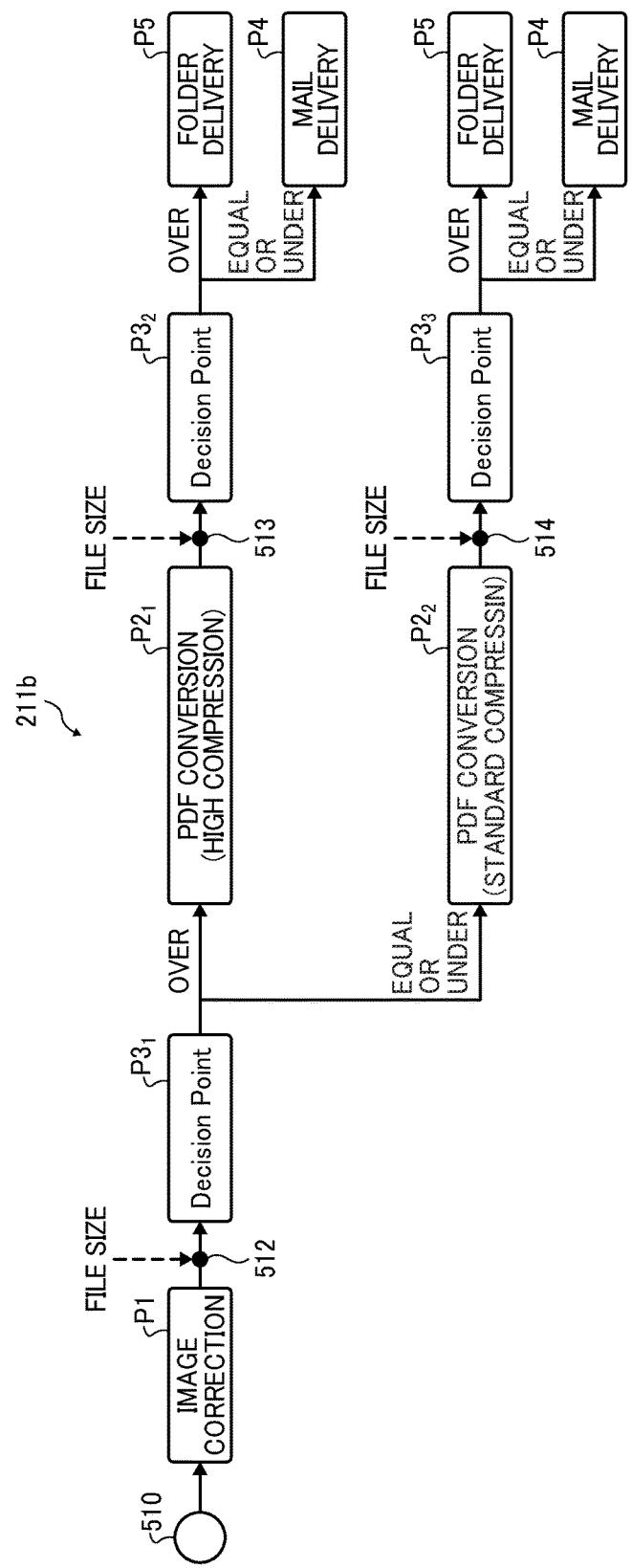
FIG. 13 is a diagram illustrating an example workflow according to the first embodiment.

FIG. 13 is a diagram illustrating an example workflow 221b in which the determination in the decision plugin P3 is performed using one of the original file size and the latest file size. It is to be noted that identical reference numerals are assigned to components illustrated in FIG. 13 that are identical to the components illustrated in FIG. 5 and description of the identical components is omitted below.

The workflow execution unit 220 performs the image processing on the electronic document input from the start point 510 at the image correction plugin P1 and then passes the electronic document to a first decision plugin $P3_1$. A file size of the electronic document as an output 512 of the plugin P1 does not change, namely is the same as the file size (original file size) of the electronic document input at the start point 510.

The first decision plugin $P3_1$ obtains the file size of the output 512 of the plugin P1 and determines whether the obtained file size is over the predetermined value. When the first decision plugin $P3_1$ determines that the obtained file size is over the predetermined size, the processing continues to a first PDF conversion plugin $P2_1$ that performs the PDF conversion in the high compression mode. On the other hand, when the first decision plugin $P3_1$ determines that the obtained file size is equal to or less than the predetermined size, the processing continues to a second PDF conversion plugin $P2_2$ that performs the PDF conversion in the standard compression mode.

The electronic document on which the PDF conversion is performed in the high compression mode in the first PDF plugin $P2_1$ is passed to a second decision plugin $P3_2$. The second decision plugin $P3_2$ obtains a file size of an output 513 of the plugin $P2_1$ and determines whether the obtained file size is over the upper limit of the mail delivery. When the second decision plugin $P3_2$ determines that the obtained file size is over the upper limit of the mail delivery, the processing continues to a plugin P5 to perform the folder delivery. On the other hand, when the second decision plugin $P3_2$ determines that the obtained file size is equal to or less than the upper limit of the mail delivery, the processing continues to a plugin P4 to perform the mail delivery.

The same applies to the case where the processing continues to the second PDF conversion plugin $P2_2$. In this case, the electronic document on which the PDF conversion is performed in the standard compression mode in the second PDF conversion plugin $P2_2$ is passed to a third decision plugin $P3_3$. The third decision plugin $P3_3$ obtains a file size of an output 514 of the plugin $P2_2$ and determines whether the obtained file size is over the upper limit of the mail delivery. When the third decision plugin $P3_3$ determines that the obtained file size is over the upper limit of the mail delivery, the processing continues to the folder delivery plugin P5. On the other hand, when the third decision plugin $P3_3$, determines that the obtained file size is equal to or less than the upper limit of the mail delivery, the processing continues to the mail delivery plugin P4.

Additionally, in FIG. 13, sets of the plugin P4 and the plugin P5 that are branched from the second decision plugin $P3_2$ and third decision plugin $P3_3$ are respectively illustrated, however, the plugin P4 and the plugin P5 can be commonly used as the subsequent plugins branched from both of the second decision plugin $P3_2$ and the third decision plugin $P3_3$.

Figure 14:
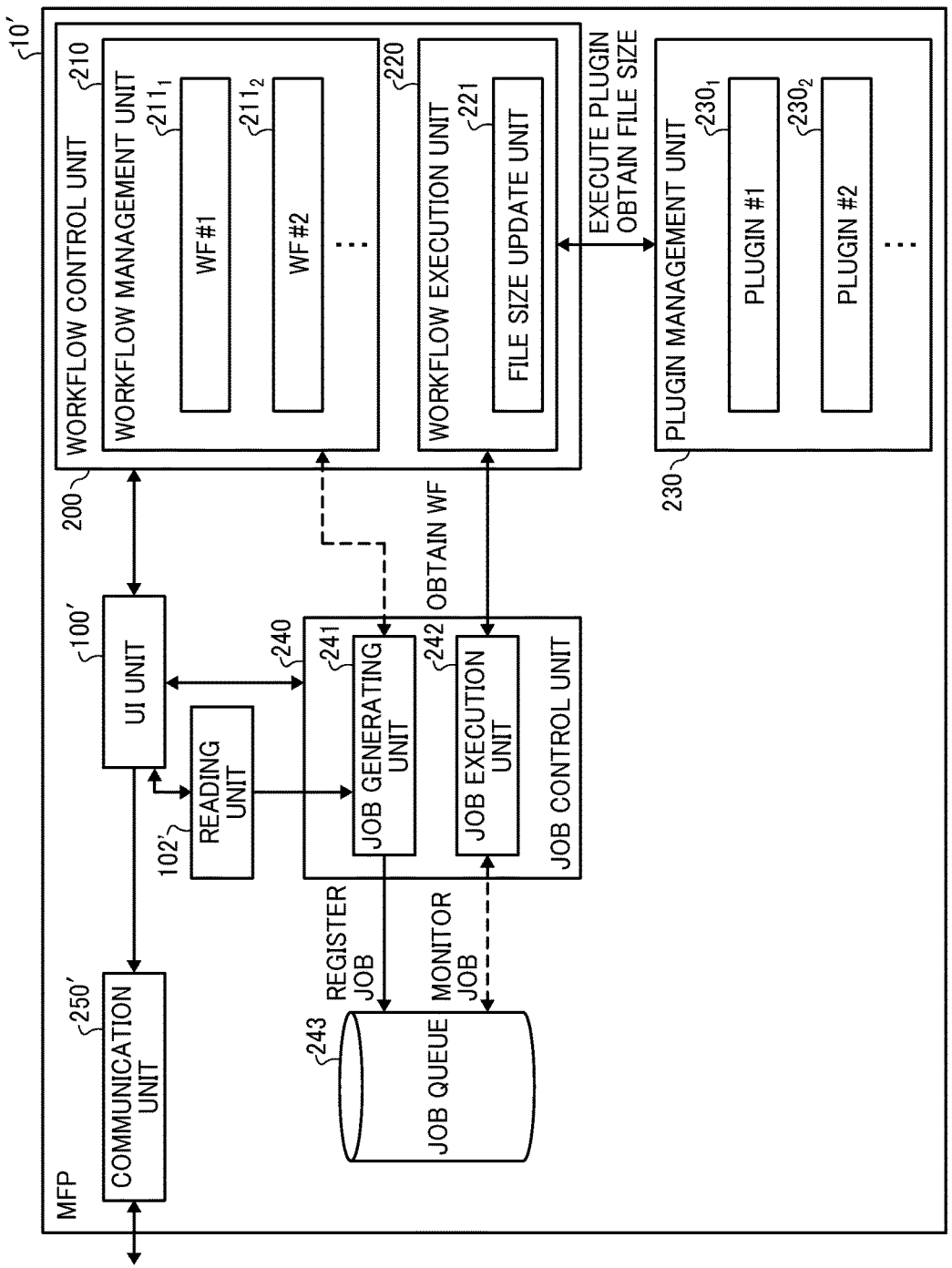
FIG. 14 is a block diagram illustrating an example configuration of an MFP according to a second embodiment.

A second embodiment of the present disclosure is one in which the functions of the WF processing server 20 are implemented by the MFP 10. FIG. 14 is a diagram illustrating an example configuration of an MFP 10' according to the second embodiment. It is to be noted that identical reference numerals are assigned to components illustrated in FIG. 14 that are identical to the components illustrated in FIG. 4 and description of the identical components is omitted below.

In FIG. 14, the MFP 10' according to the second embodiment includes the workflow control unit 200, the plugin management unit 230, the job control unit 240, and the job queue 243, which are included in the WF processing server 20 in FIG. 4, and a communication unit 250'. The communication unit 250' controls communication between the MFP 10' and an external device. The workflow control unit 200, the plugin management unit 230, the job control unit 240, and the communication unit 250' are implemented by an information processing program executed by the CPU 1000. However, this is not limiting, and alternatively a part of or all of the workflow control unit 200, the plugin management unit 230, the job control unit 240, and the communication unit 250' may be configured as a hardware circuit to operate in conjunction with each other. The job queue 243 is configured by using a predetermined memory area in the memory 1020 or the RAM 1002.

The MFP 10' according to the second embodiment also includes a UI unit 100' and a reading unit 102', which are respectively corresponding to the UI unit 100 and the reading unit 102 in FIG. 4. The UI unit 100' generates a display screen to be displayed on the display of the control panel 1040. Additionally, the UI unit 100' receives a user operation in relation to the control panel 1040, and gives an instruction to each unit of the MFP 10' according to the user operation to control the MFP 10'.

With this configuration, the UI unit 100' obtains a list of the workflows $211_1$, $211_2$, . . . from the workflow management unit 210, and causes the control panel 1040 to display the obtained list. The UI unit 100' selects one of the workflows $211_1$, $211_2$, . . . included in the list according to the user operation to the control panel 1040. The UI unit 100' passes information (e.g., ID) indicating the selected workflow to the job generating unit 241.

The reading unit 102' controls the scanner 1031 according to the instruction from the UI unit 100', and scans and reads an image of a document set on s platen according to the various setting values input from the UI unit 100'. The reading unit 102' stores the image data, which is obtained by reading the document, in a file, and passes the file to a job generating unit 241 as an electronic document. Additionally, the UI unit 100' obtains a file size of the electronic document from, for example, the reading unit 102', and generates bibliographic information having the file size. Subsequently, the UI unit 100' passes to the job generating unit 241 the bibliographic information and each type of setting value input in association with the scan.

The job generating unit 241 generates job data by combining the electronic document, which is passed from the reading unit 102', and the bibliographic information and the various types of setting values, which are passed from the UI unit 100', and stores the job data in the job queue 243.

The subsequent processing is the same as that of the WF processing server 20 according to the first embodiment described above and the description thereof is omitted below.

Additionally, the UI unit 100' causes the control panel 1040 to display the workflow setting screen 500 described above with reference to FIG. 5 in a manner that the workflow can be generated or edited.

The information processing program to implement each function of the MFP 10' according to the second embodiment may be stored in a computer-readable recording medium such as a compact disk (CD), a flexible disk (FD), and a digital versatile disc (DVD), in a file format installable or executable. Alternatively, such an information processing program may be stored in a computer connected to a network such as the internet and provided by downloading via the network. Additionally, such an information processing program may be provided or distributed via a network such as the internet.

The information processing program has a module configuration including each components described above (the workflow control unit 200, the plugin management unit 230, the job control unit 240, and the communication unit 250'). As an actual hardware configuration, the CPU 1000 reads and executes the information processing program from a recording medium such as the memory 1020 and then each of components is loaded to a main memory such as the RAM 1002 to implement the workflow control unit 200, the plugin management unit 230, the job control unit 240, and the communication unit 250' on the main memory.

According to the embodiments as described above, workflow processing is adjusted dynamically according to change of data to be processed according to a workflow.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An information processing apparatus, comprising; Circuitry; a memory, wherein the circuitry is configured to execute workflow processing on data according to a workflow, the workflow defining a plurality of processes executable in an order; and obtain a first size of the data after a specific process of the plurality of processes is performed on the data and before a one of the plurality of subsequent processes of the workflow, subsequent to the specific process, is performed, store the first size of the data in the memory, and wherein the subsequent process of the plurality of processes is performed on the data based on the first size of the data obtained, the subsequent process being one of a plurality of subsequent processes, each of the plurality of subsequent processes being defined as a process of the workflow subsequent to the specific process in the workflow, wherein the one of the plurality of subsequent processes is performed, subsequent to the specific process, based on the first size of the data stored in the memory, and wherein, upon the workflow including the specific process a plurality of times among the plurality of processes in the workflow, the circuitry is configured to obtain the first size of the data each time of the plurality of times that the specific process is performed according to the workflow, and is configured to update the first size of the data stored in the memory, after each time that the specific process is performed, each time after the first size of the data is obtained.

2. The information processing apparatus of claim 1, wherein the circuitry is configured to determine whether to perform one of the plurality of subsequent processes of the workflow, subsequent to the specific process in the workflow, according to the first size of the data.

3. The information processing apparatus of claim 1, wherein the circuitry is configured to determine which one of the plurality of subsequent processes of the workflow, subsequent to the specific process in the workflow, is to be performed, according to the first size of the data.

4. The information processing apparatus of claim 1, wherein the circuitry is further configured to:
   obtain a second size of the data before execution of the processing on the data according to the workflow, and
   perform the one of the plurality of subsequent processes, subsequent to the specific process in the workflow, based on the first size of the data and the second size of the data.

5. The information processing apparatus of claim 4, wherein the circuitry is configured to determine whether to perform one of the plurality of subsequent processes of the workflow, subsequent to the specific process in the workflow, according to the first size of the data and the second size of the data.

6. The information processing apparatus of claim 4, wherein the circuitry is configured to determine which one of the plurality of subsequent processes of the workflow, subsequent to the specific process in the workflow, according to the first size of the data and the second size of the data.

7. The information processing apparatus of claim 4 further comprising:
an interface to receive, from an image forming apparatus, image data generated by reading a document and a size of the image data,
wherein the circuitry is configured to obtain the size of the image data as the second size of the data, and is configured to execute the workflow processing on the image data received according to the workflow, in which the plurality of processes are defined, the workflow being designated with a user input to the image forming apparatus.

8. A system comprising:
the information processing apparatus of claim 7; and
the image forming apparatus configured to read the document.

9. An information processing method, comprising: starting execution of processing on data according to a workflow, the workflow defining a plurality of processes executable in an order; and obtaining a first size of the data after a specific process of the plurality of processes is performed on the data and before the one of a plurality of subsequent processes, subsequent to the specific process, is performed in the workflow storing the first size of the data obtained in a memory, wherein the starting of the execution of the processing includes performing one of the plurality of subsequent processes of the plurality of processes, each of the plurality of subsequent processes being defined as a process of the workflow subsequent to the specific process in the workflow, based on the first size of the data obtained by the obtaining, wherein the one of the plurality of subsequent processes is performed, subsequent to the specific process, based on the first size of the data obtained and stored in the memory, and wherein the obtaining of the first size of the data includes obtaining the first size of the data each time of the plurality of times that the specific process is performed according to the workflow, and updating the first size of the data stored in the memory, after each time that the specific process is performed, each time after the first size of the data is obtained.

10. The information processing method of claim 9 further comprising:
obtaining a second size of the data before the starting the starting of the execution of processing on the data according to the workflow, and
performing the one of the plurality of subsequent processes, subsequent to the specific process in the workflow, based on the first size of the data and the second size of the data.

11. The information processing method of claim 10 further comprising
receiving image data generated by reading a document in an image forming apparatus and receiving a size of the image data,
wherein the obtaining of the second size of the data includes obtaining the size of the image data as the second size of the data, and
wherein the starting of the execution of the processing on the data includes executing the processing on the image data received by the receiving according to the workflow, the workflow being designated with a user input to the image forming apparatus.

12. A non-transitory recording medium storing a plurality of instructions which, when executed by one or more processors, cause the one or more processors to perform a method, comprising: executing processing on data according to a workflow, the workflow defining a plurality of processes executable in an order; and obtaining a first size of the data after a specific process of the plurality of processes is performed on the data and before a one of the plurality of subsequent processes, subsequent to the specific process, is performed in the workflow; storing the first size of the data obtained in a memory, wherein the executing of the processing includes performing one of the plurality of subsequent processes of the plurality of processes, each of the plurality of subsequent processes being defined as a process of the workflow subsequent to the specific process in the workflow, based on the first size of the data obtained by the obtaining, wherein the executing of the processing on the data includes performing one of the plurality of subsequent processes, subsequent to the specific process, based on the first size of the data obtained and stored by the storing, and wherein the obtaining of the first size of the data includes obtaining the first size of the data each time of the plurality of times that the specific process is performed according to the workflow, and updating the first size of the data stored in the memory, after each time that the specific process is performed, each time after the first size of the data is obtained.

13. The non-transitory recording medium of claim 12, wherein the method further comprises:
obtaining a second size of the data before the executing of the processing on the data according to the workflow, and
performing the one of the plurality of subsequent processes, subsequent to the specific process in the workflow, based on the first size of the data and the second size of the data.

14. The non-transitory recording medium of claim 13, wherein the method further comprises:
receiving image data generated by reading a document in an image forming apparatus and receiving a size of the image data,
wherein the obtaining of the second size of the data includes obtaining the size of the image data as the second size of the data, and
wherein the executing of the processing on the data includes executing the processing on the image data received by the receiving according to the workflow, the workflow being designated with a user input to the image forming apparatus.

* * * * *